March 20, 1945.  W. H. FRANK  2,371,816
METHOD FOR MANUFACTURING CONTINUOUS OUTLET STRIP
Filed Jan. 22, 1942  4 Sheets-Sheet 1
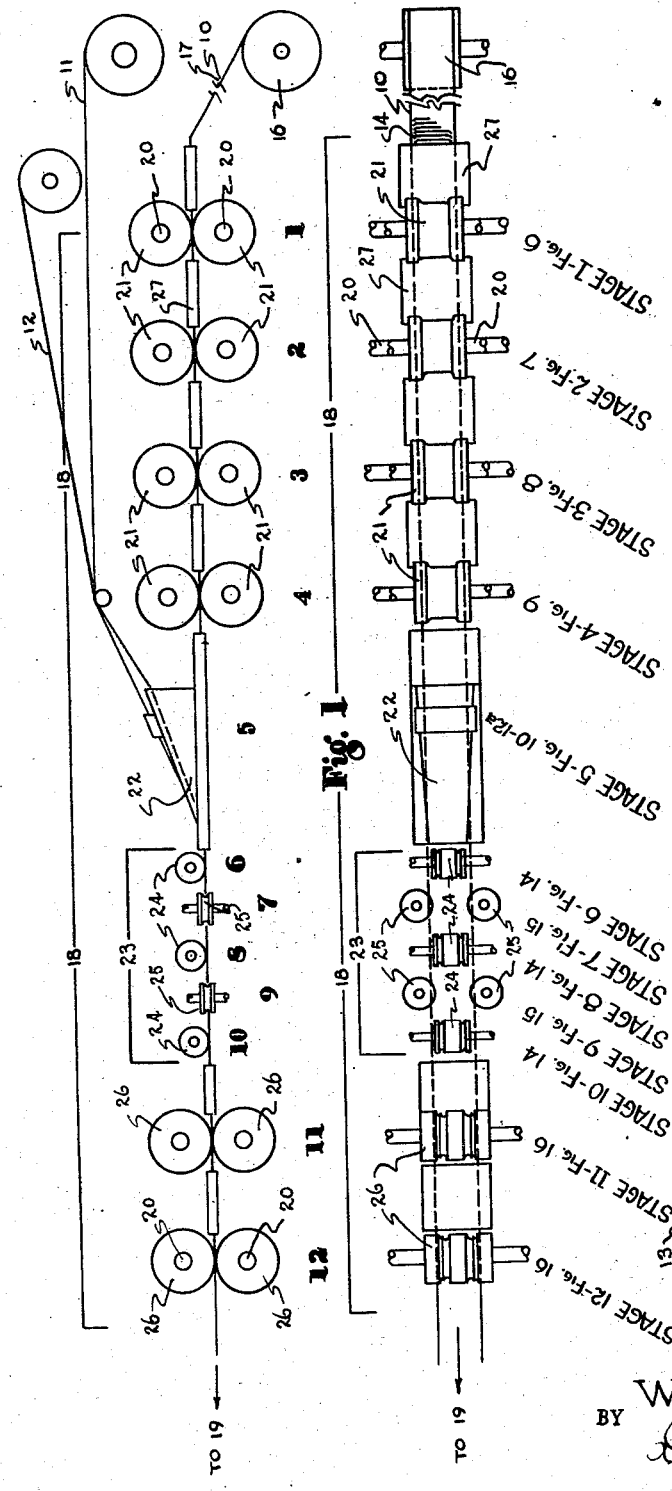
INVENTOR.
WILLIAM H. FRANK
BY
Daniel G. Cullen
ATTORNEY.

March 20, 1945.　　W. H. FRANK　　2,371,816
METHOD FOR MANUFACTURING CONTINUOUS OUTLET STRIP
Filed Jan. 22, 1942　　4 Sheets-Sheet 2

STAGE 1

STAGE 2

STAGE 3

STAGE 4

STAGE 5

INVENTOR.
WILLIAM H. FRANK
BY Daniel G. Cullen
ATTORNEY.

March 20, 1945. W. H. FRANK 2,371,816
METHOD FOR MANUFACTURING CONTINUOUS OUTLET STRIP
Filed Jan. 22, 1942 4 Sheets-Sheet 3

STAGES 6-8-10

STAGES 7-9

STAGES 11 & 12

INVENTOR.
WILLIAM H. FRANK
BY Daniel G. Cullen
ATTORNEY.

March 20, 1945.　　　W. H. FRANK　　　2,371,816

METHOD FOR MANUFACTURING CONTINUOUS OUTLET STRIP

Filed Jan. 22, 1942　　　4 Sheets-Sheet 4

INVENTOR.
WILLIAM H. FRANK
BY Daniel G. Cullen
ATTORNEY.

Patented Mar. 20, 1945

2,371,816

UNITED STATES PATENT OFFICE 2,371,816

METHOD FOR MANUFACTURING CONTINUOUS OUTLET STRIP

William H. Frank, Detroit, Mich., assignor to Bull Dog Electric Products Company, Detroit, Mich., a corporation of West Virginia Application January 22, 1942, Serial No. 427,827

3 Claims. (Cl. 153—1)

This application relates to a method for manufacturing a continuous outlet strip of the character described in my application, Serial No. 427,828, filed January 22, 1942. That application discloses a longitudinally slit strip comprising a longitudinally slit hollow metal casing having a transversely slotted back, and a longitudinally slotted front, a longitudinally slit insulation liner folded therewithin and having its front heavily beaded lips or edges registering with and exposed at the front edges of the casing, and having bus bars disposed within the folds of the insulation liner.

Strip of the type described above may be rolled continuously. In the rolling of such strip, there arose the problem of accurately and uniformly maintaining the spacing between the slot edges of the liner, and preventing them from approaching and narrowing the slot between them, as well as the problem of uniformly forming the casing, and also the problem of forming the casing without distorting or excessively squeezing the liner and making electrical disturbances possible. The method and rolling machine herein disclosed have solved such problems successfully.

For an understanding of the method and machine herein disclosed, reference should be had to the accompanying drawings. In these drawings, Figs. 1 and 2 are diagrammatic elevation and plan views, respectively, of the forming unit only of a machine for forming a continuous outlet strip.

Fig. 3 is a fragmentary view of the liner and the bus bars and their association with a forming guide.

Fig. 4 is a cross-sectional view of the completed strip.

Fig. 5 is a cross-sectional view of strip just after the liner and bus bars are laid in a partly shaped metal casing, as the strip passes through rollers.

The strip

Figure 6:
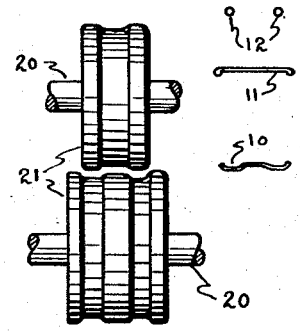
Figs. 6-9 are fragmentary views of rollers of the machine and transverse sectional views of the strip as the casing thereof passes through the rollers.
Figure 7:
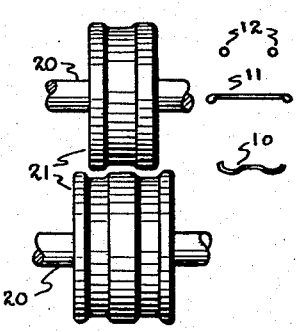
Figure 8:
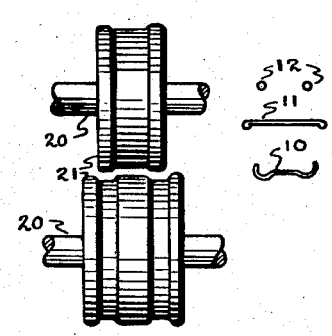
Figure 9:
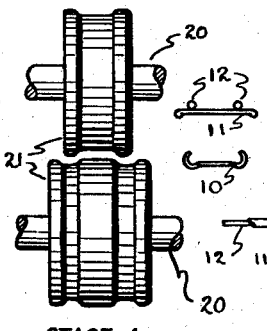
Figure 10:
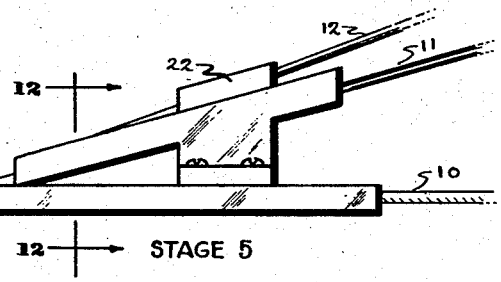
Figs. 10-12 are elevation, plan, and sectional views, respectively, of the forming means for the liner and bus bars.
Figure 11:
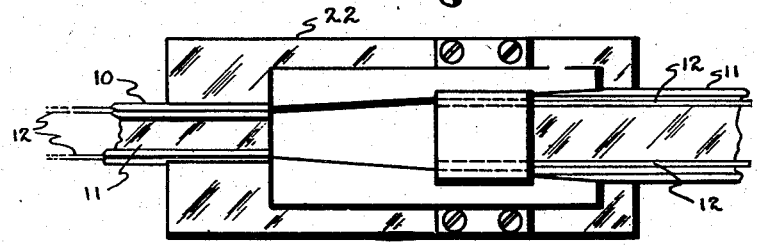
Figure 12:
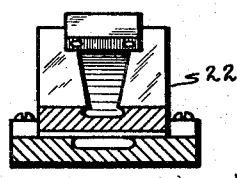
Figure 12A:
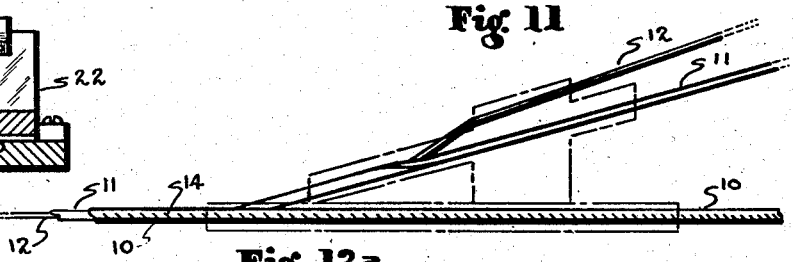
Fig. 12a is a diagrammatic view of the forming means for the liner and bus bars.
Figure 14:
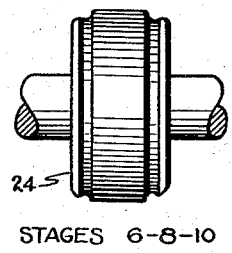
Figs. 14-16 are fragmentary views of an edge spacer roller, a casing forming roller, and two finishing rollers, respectively.

A continuous outlet strip to be made by the method and machine herein shown, includes a C shaped or longitudinally slit metal casing 10, a C shaped or longitudinally slit folded insulation liner 11 therewithin, and two bus bars or conductor wires 12 disposed within the folds of the C shaped liner. The edges of the liner are formed as thick heavy beads or lips 13. The casing is formed with transverse slots 14 which have the shape shown in Fig. 18, when the casing ribbon has not yet been formed. The strip has uniformly longitudinally spaced mounting holes 15. Such strip is shown generally in my application, Serial No. 427,828, filed January 22, 1942.

The method in general

Generally speaking, the method of this application comprises feeding from spools, a ribbon of transversely slit thin sheet metal, a ribbon of relatively soft, plastic, beaded edge, insulation liner and two round wires or bus bars, and causing the ribbons to travel individually, and at the same rate through guides and rollers. These partially bend the metal casing ribbon into a U shape, fold the liner to a C shape around the conductors, dispose the liner with the bus bars therein, into the U shaped casing, and thereafter, while accurately and uniformly maintaining the spacing between the edges of the liner, and preventing them from approaching and narrowing the slot between them, continuously turning the edge portions of the casing downwardly and inwardly, by pressure from finishing rollers, over the folds of the liner, to maintain accurately a uniform product.

Before the metal ribbon is formed, it is transversely slitted. After the strip is formed it is apertured at uniformly longitudinally spaced points, and it is stamped at uniformly longitudinally spaced points with a trade-mark or other label or marking, and the footage of the strip is counted and desired lengths are cut off.

The machine

Figure 18:
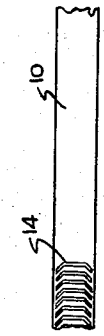
Fig. 18 shows casing strip before being formed.

In Figs. 1—2—18 there is shown a layout or diagrammatic representation of a machine for carrying out the method heretofore described. Generally speaking, the machine comprises a metal ribbon feed spool 16, a metal ribbon slitting means 17, a forming unit 18, and a hole punching-hole counting-marking, and length cutting unit 19.

Figure 13:
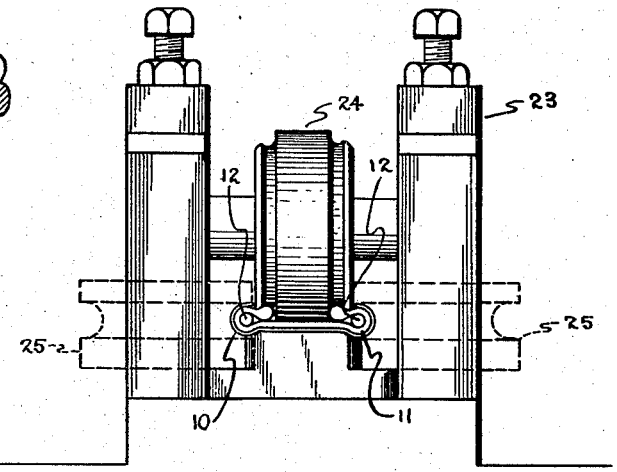
Fig. 13 is a partial view of a liner edge spacing and casing forming unit of the machine showing an edge spacer roller and two casing forming rollers.
Figure 15:
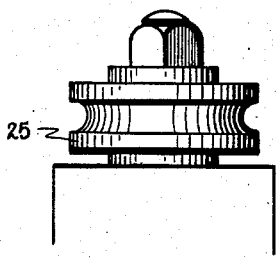
Figure 16:
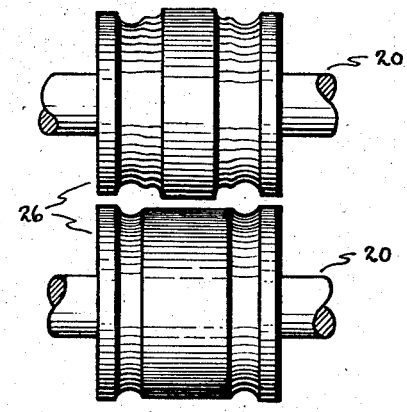
Figure 17:
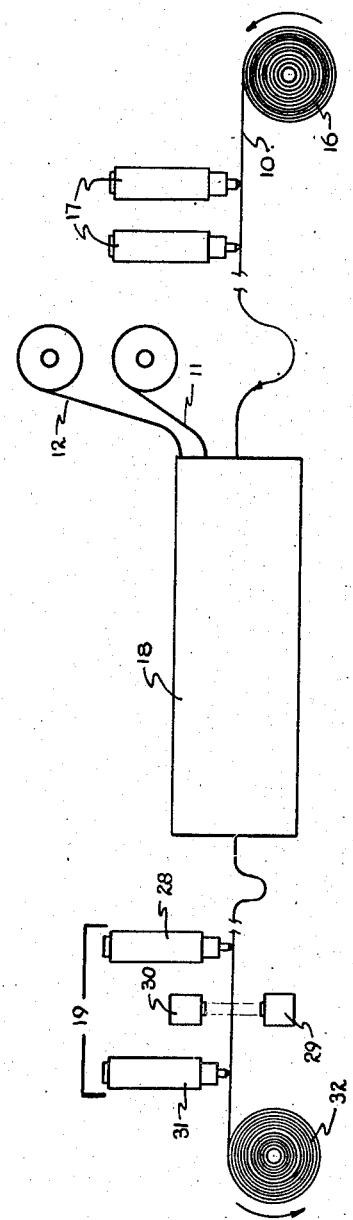
Fig. 17 shows a layout of the complete machine.

The forming unit 18 includes a bed or frame upon which are mounted, on suitably disposed transverse axles 20, defining a plurality of stages, pairs of rollers 21 which bend the metal casing ribbon coming from the slitting means 17 into a U shape, before the liner and bus bars are associated with the casing. A forming means 22 folds the insulation liner over the wires or bus bars, and lays the liner and wire strip into the partly formed U shaped casing, (Fig. 5). The outer dimension of the liner is determined, at least partially, by the shape of the casing at that time. The strip (Fig. 5) then proceeds to the unit 23 (Fig. 13).

Rollers 24 thereof engage the liner edges to pocket the bus bars and to prevent the liner edges from approaching, thus preventing contraction or deformation of the liner, while forming rollers 25 bend the U shaped casing over and snugly onto the liner and bus bars, into a C shaped casing, without squeezing the liner. The pairs of rollers 26 finish the forming of the casing over the liner and the bus bars.

Guides 27 between the rollers keep the strip parts in line as they approach successive rollers.

The rollers and forming means are arranged in a plurality of stages (twelve). Stages 1-4 include the rollers which bend the casing to U form. Stage 5 includes the means which folds the liner to C form, around the bus bars. Stages 6, 8, 10 include the spacer rollers 24 which prevent the liner edges from approaching. Stages 7 and 9 include the rollers 25 which bend the casing over the liner and the bus bars, to C form. Stages 11 and 12 include the rollers 26 which finish the operation of bending the casing over the liner and bus bars.

At no time is the liner squeezed or used as a mandrel. The shape of the casing is determined solely by the rollers 21 and 25, and not by the liner. The shape of the liner is determined by the casing, and then maintained by rollers 24 engaging the beads 13 of the liner.

After the strip leaves the forming unit it is punched with holes 16, and stamped for labelling or marking by a stamp or punch 28. As the holes 16 pass over an "electric eye" or photoelectric cell 29, they permit the beam thereof to energize a counter relay 30 which controls a length cut off means 31 to cut off suitable lengths of strip as it is wound on a coil winder 32.

Now having described the method and machine hereof, reference should be had to the claims which point out and distinctly claim the method and machine comprising the invention.

I claim:

1. A method for continuous manufacture of longitudinally slit strip comprising a longitudinally slit hollow metal casing, and a soft plastic, longitudinally slit hollow liner therewithin and lining it, the liner strip having stiffening wires within the folds thereof, comprising continuously forming a flat metal casing ribbon into a U shaped strip, having the edge portions formed up from the back of the strip, but not turned in, continuously laying into the U shaped casing strip a completely formed strip of liner, containing the stiffening wires, and thereafter, while accurately maintaining the liner to its original shape by insertion of a means within the liner resisting any contraction or deformation thereof, continuously turning the edge portions of the casing downwardly and inwardly, by pressure from outside the turned up sides of the U strip in opposite directions inwardly and downwardly, to form the casing to finished form, snugly engaging the liner, but without having contracted or deformed it.

2. A method for continuous manufacture of strip having a longitudinally slit casing and a soft plastic hollow longitudinally slit liner containing stiffening wires which comprises the steps of forming the casing into a U shape, forming the liner to desired shape, with its outside dimensions at least partially determined by the U shape of the casing, and laying the liner with its stiffening wires in the casing, and thereafter, while accurately maintaining the liner to its original shape, i. e., prevented from contracting, by insertion of a means within the liner resisting any contraction thereof, closing in the free edges of the casing, around and against the liner, to the desired casing shape, by pressure from outside the casing.

3. A method for continuous manufacture of longitudinally slit strip comprising a longitudinally slit hollow metal casing, and a soft plastic, longitudinally slit hollow liner therewithin and lining it, the liner strip having stiffening wires within the folds thereof, comprising continuously forming a flat metal casing ribbon into a U shaped strip, having the edge portions formed up from the back of the strip, but not turned in, continuously laying into the U shaped casing strip a completely formed strip of liner, containing the stiffening wires, with the outer dimensions of the strip, being determined, at least partially, by the U shaped casing, and thereafter, while accurately maintaining the liner to its original shape by insertion of a means within the liner resisting any contraction or deformation thereof, continuously turning the edge portions of the casing downwardly and inwardly, by pressure from outside the turned up sides of the U strip in opposite directions inwardly and downwardly, to form the casing to finished form, snugly engaging the liner, but without having contracted or deformed it.

WILLIAM H. FRANK.